US011328437B2

(12) United States Patent
Hillman

(10) Patent No.: US 11,328,437 B2
(45) Date of Patent: May 10, 2022

(54) METHOD FOR EMULATING DEFOCUS OF SHARP RENDERED IMAGES

(71) Applicant: Weta Digital Limited, Wellington (NZ)

(72) Inventor: Peter Hillman, Wellington (NZ)

(73) Assignee: Weta Digital Limited, Wellington (NZ)

( * ) Notice: Subject to any disclaimer, the term of this patent is extended or adjusted under 35 U.S.C. 154(b) by 0 days.

(21) Appl. No.: 17/086,032

(22) Filed: Oct. 30, 2020

(65) Prior Publication Data

US 2022/0076437 A1 Mar. 10, 2022

Related U.S. Application Data

(60) Provisional application No. 62/706,747, filed on Sep. 8, 2020.

(51) Int. Cl.
*G06T 7/529* (2017.01)
*G06T 5/00* (2006.01)
*G06T 11/00* (2006.01)
*G06T 7/13* (2017.01)
*G06T 3/40* (2006.01)

(52) U.S. Cl.
CPC ............... *G06T 7/529* (2017.01); *G06T 3/40* (2013.01); *G06T 5/002* (2013.01); *G06T 7/13* (2017.01); *G06T 11/001* (2013.01); *G06T 2207/10024* (2013.01); *G06T 2207/10028* (2013.01); *G06T 2207/20182* (2013.01)

(58) Field of Classification Search
CPC ................... G06T 11/001; G06T 2207/10024
See application file for complete search history.

(56) References Cited

U.S. PATENT DOCUMENTS 9,734,551 B1 * 8/2017 Esteban ................. G06T 5/002
10,453,220 B1 * 10/2019 Mihal .................. G06N 3/0454
10,645,294 B1 5/2020 Manzari et al.
(Continued)

FOREIGN PATENT DOCUMENTS

EP 1970863 A1 2/2008
EP 3288253 A1 2/2018

OTHER PUBLICATIONS

International Search Report and Written Opinion for PCT/NZ2020050168, dated Nov. 2, 2021.
(Continued)

*Primary Examiner* — Phi Hoang
(74) *Attorney, Agent, or Firm* — William T. Hoyer McCarthy; Haynes and Boone LLP

(57) ABSTRACT

Methods and systems for defocusing a rendered computer-generated image are presented. Pixel values for a pixel array are determined from a scene description. A blur amount for each pixel is determined based on a lens function representing a lens shape and/or effect. A blur amount and blur transparency value are determined for the pixel based on the lens function and pixel depth. A convolution range comprising pixels adjacent to the pixel is determined based on the blur amount. A blend color value is determined for the pixel based on the color value of the pixel, color values of pixels in the convolution range, and the blur transparency value. The blend color value is scaled based on the blend color value and a modified pixel color value is determined from scaled blend color values.

24 Claims, 14 Drawing Sheets

(56) References Cited

U.S. PATENT DOCUMENTS

| | | | | |
|---|---|---|---|---|
| 2007/0110303 | A1* | 5/2007 | Bhattacharjya | G09G 3/2051 |
| | | | | 382/166 |
| 2011/0102457 | A1 | 5/2011 | Bhatt et al. | |
| 2012/0127193 | A1* | 5/2012 | Bratt | G09G 5/022 |
| | | | | 345/590 |
| 2013/0170756 | A1* | 7/2013 | Shibasaki | G06T 7/13 |
| | | | | 382/199 |
| 2014/0294299 | A1* | 10/2014 | Kim | G06T 5/002 |
| | | | | 382/167 |
| 2015/0142795 | A1 | 5/2015 | Carpenter et al. | |
| 2016/0301868 | A1 | 10/2016 | Acharya et al. | |
| 2017/0053411 | A1* | 2/2017 | Powell | G01B 11/25 |
| 2017/0132810 | A1 | 5/2017 | Gilra et al. | |
| 2017/0309215 | A1 | 10/2017 | Perdices-Gonzalez et al. | |
| 2017/0332063 | A1* | 11/2017 | Kontkanen | H04N 13/106 |
| 2020/0082535 | A1* | 3/2020 | Lindskog | G06K 9/00228 |

OTHER PUBLICATIONS

Selgrad, Kai, et al. "Real-Time Depth of Field Using Multi-Layer Filtering," Proceedings of the 19th Symposium on Interactive 3D Graphics and Games, I3D '15, pp. 121-127, Jan. 1, 2015.

Hinds, Arianne T., et al., "Immersive Technologies Media Format Scene Graph Specification", 131, MPEG Meeting; Jun. 29, 2020-Jul. 3, 2020; Motion Picture Expert Group or ISO/IEC JTC1/SC29/WG11), No. m54242, Jun. 13, 2020. URL:http://phenix.int-evry.fr/mpeg/doc_end_user/documents/131_Online/wg11/m54252-v1-m54252.zipm54252/IDEAITMF Scene Graph Public Draft 0.9.pdf.

Wu, Jiaze et al., "Rendering realistic spectral bokeh due to lens stops and aberrations", The Visual Computer International Journal of Computer Graphics, Springer, Berlin, DE, vol. 29, No. 1, Feb. 9, 2012, pp. 41-52.

McGraw, Tim, "Fast Bokeh effects using low-rank linear filters", Visual Computer, Springer, Berlin, DE, vol. 31, No. 5, May 21, 2014, pp. 601-611.

\* cited by examiner

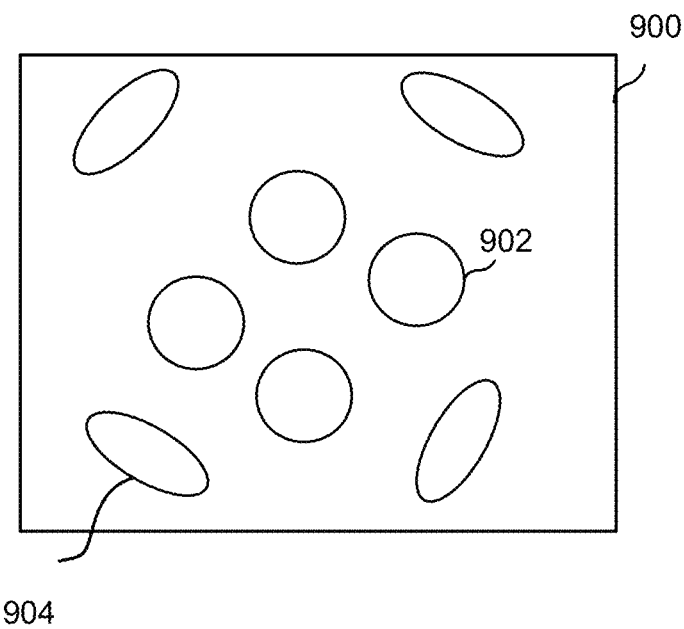
FIG. 9
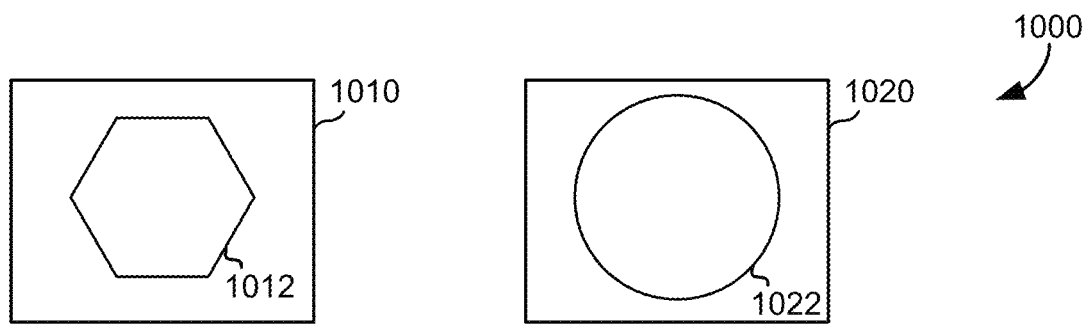
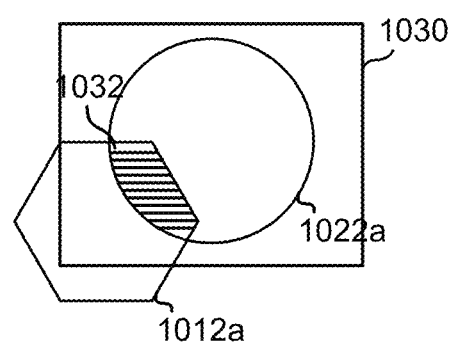
FIG. 10

METHOD FOR EMULATING DEFOCUS OF SHARP RENDERED IMAGES

CROSS-REFERENCE TO RELATED APPLICATIONS

This application claims the priority benefit of U.S. Provisional Patent Application No Application No. 62/706,747, filed Sep. 8, 2020, hereby incorporated by reference in its entirety as though fully set forth herein.

FIELD OF THE INVENTION

The present disclosure generally relates to methods and apparatus for computerized image processing and more particularly to processing a computer-generated image to emulate defocus effects.

BACKGROUND

For computer-generated imagery or computer-enhanced imagery, whether individual images or video sequences of images sometimes referred to as frames, might be stored in computer memory such that computer systems, such as animation creation systems, renderers, projectors, etc. can access that imagery and operate on it or present it. In a basic representation, an image is stored in a form of a two-dimensional (2D) pixel array where each element or sample of the pixel array corresponds to a position on the image and has a pixel color value. The pixel color value might have a single component value or might have a plurality of component values (e.g., red, green, and blue component values, and an alpha value representing a transparency amount). The image can be displayed by coloring pixels of a display according to the pixel color values that correspond to positions of the display.

But one specific example is a stored representation of an image that is a rectangular image of R rows by C columns wherein the stored representation includes R×C pixel color values, each of which might comprise three or more component color values.

An image might be computer-generated from a scene description that describes virtual objects, lighting, effects, a camera position, a camera orientation, a camera viewing frame, etc. in a three-dimensional (3D) virtual space. An image generator, such as a renderer, might compute pixel color values based on which objects are intersected by rays from the camera position through pixel areas of the camera viewing frame. In an example, a scene description might specify the positions, shapes, texture, colors, etc. of various objects and a renderer could generate an image of what the scene would look like from a specified camera position through a specified camera viewing frame. Such a generated image might not show a far object if that far object is further from the camera position than a near object and both the far object and the near object are intersected by a viewing ray from the camera position through a pixel or pixels of the viewing frame. In some cases, such as where the near object is partially translucent or only covers a portion of a given pixel's area in the generated image, the resulting pixel color value for that given pixel might be a combination of color from the near object and color from the far object that can be partially seen at that given pixel. In a logical representation of an image, a pixel might have a nonzero area and a pixel cone or pyramid might be considered instead of a ray. In the general case, the camera position might be a point located in the 3D virtual scene space, a pixel is an area that is a portion of the camera viewing frame (which would represented as part of the resulting image representing a view from the camera position through the camera viewing frame), and a pixel color value represents color from objects that are within a volume swept out by rays that pass from the camera position through points within the pixel area. Thus, a pixel color value might be determined by sampling several rays through the pixel area, or determining what virtual objects are present, or partly present, within the swept-out volume.

An image management system, as might be part of an animation creation system, might generate the pixel array with more information per pixel than just an ultimate pixel color value that might be displayed for a given pixel. A "deep image" might refer to a stored representation of an image that includes pixel color values for different depths of a pixel. With such a deep image representation, instead of just a pixel color value for a pixel area of the camera viewing frame, the deep image representation might include a plurality of pixel color values, with different ones of the plurality representing pixel color values at different depths. In one interpretation, a stored pixel color value, P, for a depth, D, for a pixel at image location (X, Y) might represent a pixel color that would be seen at pixel location (X, Y) in the image but for objects that are intersected by a ray from the camera position through pixel location (X, Y) when those objects are at a depth of less than D. With a stored representation of pixel color values at multiple depths, it might then be a simple matter to appear to "remove" objects from an image.

In an example, consider a scene description where a ray from the camera position through a pixel, P1, or the area thereof, passes through a first opaque object, O1, at a depth D1 and passes through a second opaque object, O2, at a depth D2, where D1<D2. A simple image would show a pixel of object O1 at pixel P1. A deep image might store color values for both objects and their corresponding depths. From such a deep image, an animator or other image processor or user could specify that objects at depths of D3 or less where D1<D3 should be removed. An image generation system has enough information to "remove" object O1, which can appear to be done in the image by using the stored pixel color value for (P1, D2) instead of the stored pixel color value for (P1, D1). As a result, a deep image can be useful when working with images generated from 3D scene descriptions or other 3D representations where changes are desired after the image is generated.

In some embodiments, a method and apparatus for emulating a depth of field effect of a physical camera and allowing portions of a scene to be defocused post-rendering might be desirable.

SUMMARY

A computer-implemented method for processing image data that includes depth information might comprise, under the control of under the control of one or more computer systems configured with executable instructions, obtaining a scene description describing elements of a scene to be rendered into a rendered computer-generated image representable by a pixel array, determining, from the scene description, pixel values for the pixel array corresponding to a rendering of the scene, the pixel array comprising a plurality of pixel data elements, wherein a pixel data element of a pixel of the pixel array includes a color value, an alpha value, and a depth value, and wherein the pixel data element has associated therewith an image position representing a position of the pixel in the rendered computer-generated image, obtaining an indication of a lens function, wherein a lens function represents a lens shape and/or a lens effect, determining, for the pixel, a blur amount based on the lens function and the depth value of the pixel, determining, for the pixel, a convolution range comprising adjacent pixels adjacent to the pixel, wherein the convolution range is based on the blur amount, determining, for the pixel, a blur transparency value representing an amount of transparency to assign to the pixel based on the lens function and the pixel depth, determining, for the pixel, a blend color based on color values of the adjacent pixels, the color value of the pixel, and the blur transparency value, scaling the blend color value based on the blur transparency value to form a scaled blend color value, and determining, for the pixel, a modified pixel color value from the scaled blend color value.

The pixel data element may further include the blur transparency value representing an amount of transparency to assign to the pixel data element based on the lens function and pixel depth.

A method may further comprise adjusting, for the alpha value and the blur transparency value as part of determining the blend color.

Scaling the blend color value may comprise multiplying pixel color component values by a scaling factor, S, that is computed as S=1/(1−H) wherein H represents a proportion of a background object that would contribute to the blend color value but is obscured by a foreground object.

A method may further comprise pre-computing a per-pixel blur transparency map from the scene description.

A method may further comprise performing edge detection to detect edges of image elements in the rendered computer-generated image, and pre-computing a per-pixel blur transparency map from detected edges.

The pixel color value may comprise a plurality of color components.

The methods might be implemented as instructions on a non-transitory computer-readable storage medium that, when executed by at least one processor of a computer system, causes the computer system to carry out one or more steps of some or all the methods above.

A computer-readable medium carrying instructions, which when executed by at least one processor of a computer system, might be created that causes the computer system to carry about some or all the methods above.

A user interface might be provided for indicating construction of computer-generated images. A user interface for processing image data that includes depth information might comprise a first presentation element for at least a portion of a scene description, wherein the scene description defines elements of a scene to be rendered into a rendered computer-generated image representable by a pixel array, wherein pixel values for the pixel array correspond to a rendering of the scene, the pixel array comprising a plurality of pixel data elements, wherein a pixel data element of a pixel of the pixel array includes a color value, an alpha value, and a depth value, and wherein the pixel data element has associated therewith an image position representing a position of the pixel in the rendered computer-generated image. The user interface might also comprise a second presentation element for obtaining from a user an indication of a lens function, wherein the lens function represents a lens shape and/or a lens effect. The user interface might also comprise a third presentation element for obtaining from the user a convolution range comprising adjacent pixels adjacent to the pixel, wherein the convolution range is based on a blur amount and a blur transparency value, wherein the blur amount is based on the lens function and the depth value of the pixel, and wherein the blur transparency value represents an amount of transparency to assign to the pixel based on the lens function and the depth value of the pixel. The user interface might also comprise a display for displaying a modified image including a modified pixel having a modified pixel color value, wherein the modified pixel color value is a first value that is a function of a scaled blend color value formed from a blend color value, wherein the blend color value is a first scaled value that is based on the blur transparency value, and wherein the blend color value is a second value that is based on color values of the adjacent pixels.

BRIEF DESCRIPTION OF THE DRAWINGS

Various embodiments in accordance with the present disclosure will be described with reference to the drawings, in which:

FIG. 9 illustrates an image with a vignette effect, in an embodiment.

FIG. 10 illustrates a technique for achieving a vignette effect, in an embodiment.

DETAILED DESCRIPTION

Figure 1:
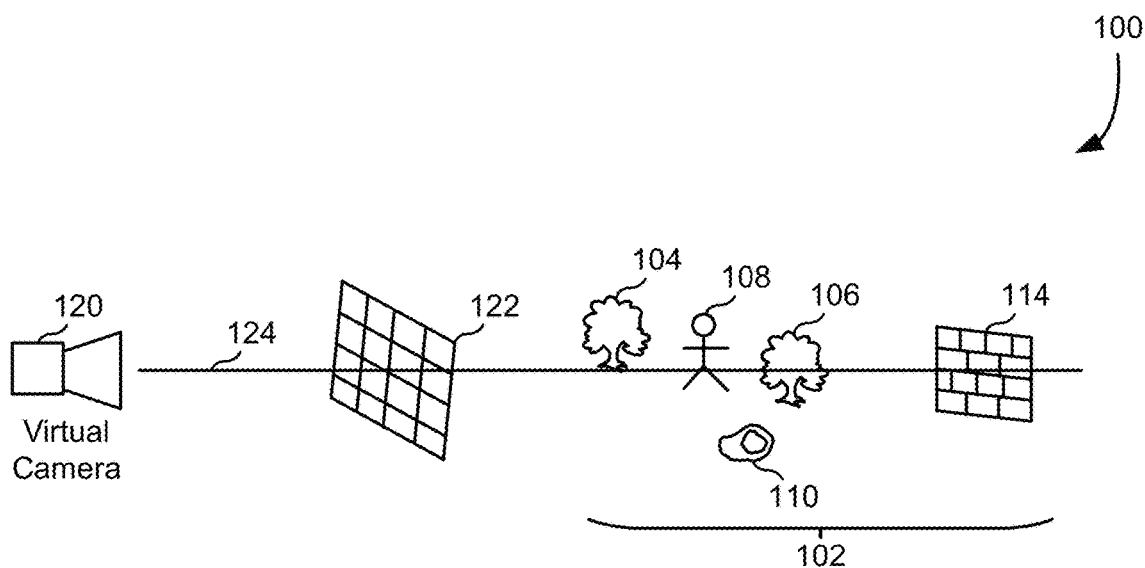
FIG. 1 illustrates a process used to compute deep image data as might represent a virtual scene, in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A deep image might be represented by data corresponding to pixels in image space. The deep image might be generated from virtual objects described in a scene space and then by rendering, or otherwise, is represented in an image dataset that might specify, for example, for each pixel in a pixel array, a pixel image value array. Each entry in the pixel image value array might comprise a pixel color value, an optional alpha value, a depth value or a depth range, and an object identifier identifying which object contributes that color/alpha at the specified depth. The pixel image value array might be associated with a particular pixel by an explicit reference to an associated pixel position or the particular pixel might be determinable by a position of the pixel image value array within the image dataset.

A scene may be defocused by applying a lens blur filter with different parameters to give the resulting image a depth of field effect similar to what may be achieved in a photograph taken with a physical camera. Existing methods of doing so can be computationally expensive and achieve limited results. For example, a scene may be divided into vertical layers based on the distance of pixels from a virtual camera, and a blurring effect may be applied to each layer. The blurring effect applied, however, may be uniform throughout a layer (e.g., every pixel in the layer is blurred by the same amount), resulting in images that lack detail, particularly when a narrow depth of field is involved.

In a specific example, a scene description might describe tree objects in a forest of trees. An image dataset might be provided to an animator that is a deep image of that scene, rendered into a deep image. The animator might specify which trees are to be removed from the scene as a running character is added into the scene. With each object's contribution to a pixel color value provided by the deep image dataset, removing some trees can be done by searching the image dataset for pixel image value array entries, over all the pixel image value arrays, that have object identifiers equal to the object identifiers of the trees to be removed. Entries can be added of the character to the pixel image value arrays of pixels intersected by the character at the depth of the character in the scene.

It may be desirable to defocus objects within the scene to draw attention to different objects in the scene in a way that emulates the depth of field effect of a physical camera. For example, trees in the background may be defocused while focus is placed on the running character. Achieving a desired result for the look of a scene may require experimentation with different parameters such as the amount of blur to be applied, a lens shape, and a lens effect. Modifications to any of the parameters may require rendering a scene again to view the result of the modifications. Therefore, it would be useful to be able to defocus objects or sections of a scene post-rendering, without requiring re-rendering the scene. Similarly, it might be useful to be able to defocus objects or sections of a photograph taken with a physical camera where depth information is known or can be estimated, avoiding reshoots and allowing lens effects to be created that are difficult or impractical to create with existing camera lenses.

In some embodiments, at least some depth values, color values, or other information may be stored in a compressed format.

FIG. 1 illustrates a process used to compute deep image data as might represent a virtual scene, in an embodiment. As illustrated there, capturing 100 of data related to a virtual scene can involve virtual objects 102 placed in a scene space, such as a tree 104, a tree 106, a person 108, a rock 110, and a brick wall 114. To generate an image of the virtual scene, an image-generating computer would compute which virtual objects 102 are visible from a camera 120 at a camera position through pixels of a view frame 122 by computing which objects intersect a ray 124 running from the camera position through a given pixel. For a deep image, rather than just storing a single color value (or color vector in a color space), the deep image might include pixel colors for objects at different depths along ray 124. In this example, where brick wall 114 covers the entire pixel, any objects that are further from the camera than brick wall 114 can be ignored. Alternatively, they might be included in the depth image to provide for the case where brick wall 114 might be moved in editing. In some embodiments, more than one ray is used per pixel and a combination method is used to derive the data for the deep image.

Figure 2:
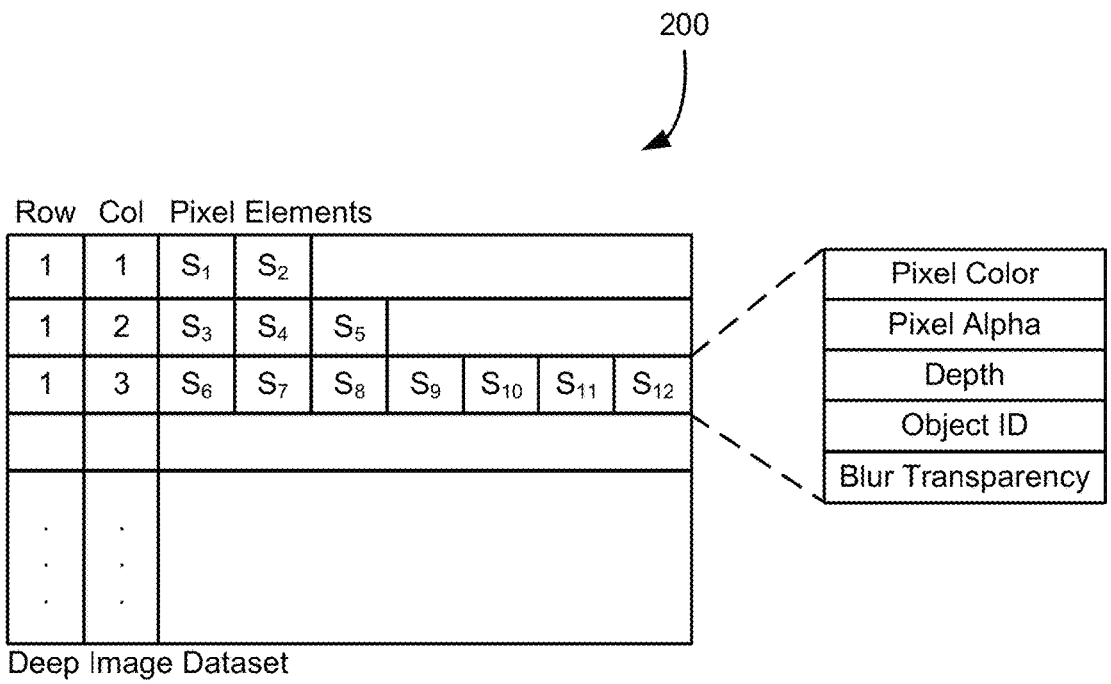
FIG. 2 illustrates a data structure that might be used to store a deep image dataset representing a deep image of a virtual scene, in an embodiment.

FIG. 2 illustrates a data structure that might be used to store a deep image dataset 200 representing a deep image of a virtual scene, in an embodiment. Deep image dataset 200 might include one row per pixel of a deep image, possibly omitting unused pixels. As illustrated, each pixel might be represented by one or more pixel elements, or samples, indicated as S1, S2, in FIG. 2. In that example, the pixel at location (1, 1) in the image has an array comprising two pixel elements, the pixel at location (1, 2) in the image has an array comprising three pixel elements, and the pixel at location (1, 3) in the image has an array comprising seven pixel elements. Each pixel element might contain data indicating a pixel color (which could be a single value, three values, or some other representation of a pixel color value), a pixel alpha (which might range from 0.0 to 1.0 to indicate a degree of transparency), a depth representing a distance from a camera position to an object that is contributing color to that pixel, an object identifier identifying that object, and a blur transparency value indicating the amount of transparency at a pixel as a result of a blur or defocus operation. While the contributions of objects in these examples are pixel colors, it may be that other attributes of objects are used instead of, or in addition to, color. The length of a pixel image value array might be one or more image value array elements, each having an image value, a depth value, and an association with an associated pixel position. The pixel position might be explicit, as illustrated in the data structure of FIG. 2, or might be implied by the data structure used to store the pixel image value arrays.

In some cases, at least some pixel elements of at least some pixels may be stored in a compressed format. For example, adjacent pixels having identical color, depth, and transparency values may be stored as a block of pixels rather than as individual pixels.

Figure 3:
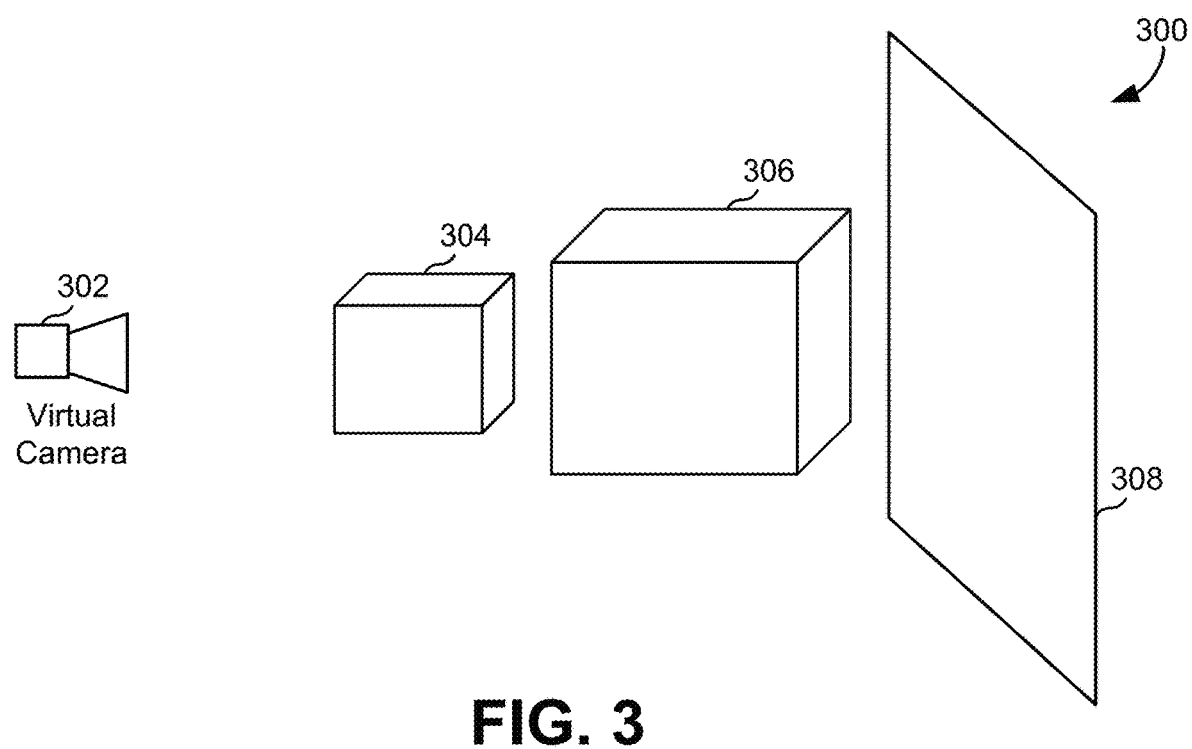
FIG. 3 illustrates a virtual scene including objects to which defocusing may be applied, in an embodiment.

FIG. 3 illustrates a virtual scene 300 including objects to which defocusing may be applied, in an embodiment. Included in scene 300 are two boxes, 304 and 306, centered horizontally in the line of sight of virtual camera 302. Box 304 is in front of box 306 in that it is closer to the virtual camera 302, and both boxes are in front of a background 308. While background 308 is illustrated with a solid color, it should be understood that objects and backgrounds may be varying in color. Box 304 is smaller than box 306 and partially obscures box 306. If box 304 is fully opaque, a two-dimensional rendering of the scene (e.g., image 400 of FIG. 4) from the point of view of virtual camera 302 would show box 304 in front of box 306, with a portion of box 306 hidden behind box 304, and a portion of the background 308 hidden behind both boxes 304 and 306. The obscured portions of box 306 and background 308 would be essentially disregarded by the renderer when rendering the scene 300, as they would not to be visible in the rendered image. If, however, box 304 were defocused during rendering, portions of the previously obscured part of box 306 would become visible through the blurred portions of box 304. How much of the obscured region of box 306 would become visible, and to what extent the obscured region of box 306 would be visible (such as how clear the region would appear) is determined in part by the blur amount (such as how much blurring occurs), and a transparency value (e.g., an alpha value) defining the transparency of pixels of box 304 in the blurred region.

For example, if box 304 is a solid red color and box 306 is a solid blue color, portions of the blurred region may appear as various shades of purple, with portions of the blurred region closer to the box 304 appearing more red, and portions of the blurred regions further from box 304 appearing more blue. If the scene is rendered without defocusing box 304, however, the color information from the obscured portion of box 306 is lost, making defocusing box 304 post-rendering difficult. A blur amount might be determined by a convolution range over which a blur occurs. Of course, the color contribution of an object over various pixels might vary based on color variations over the object.

Figure 4:
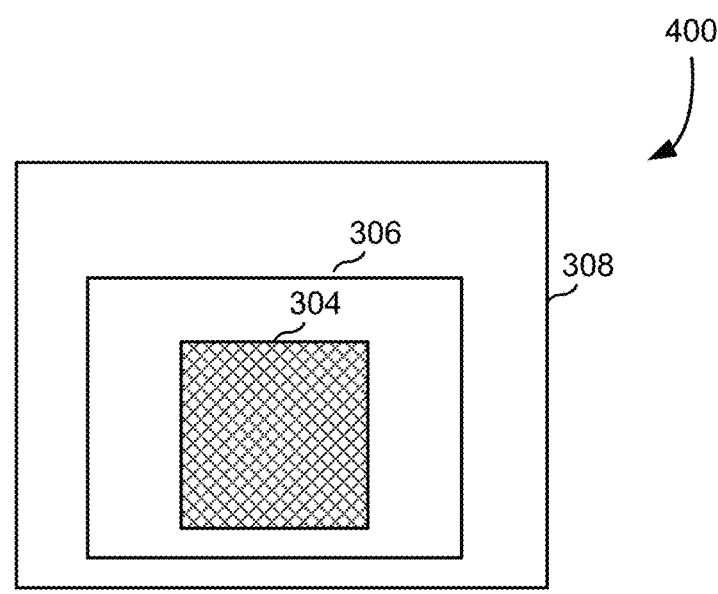
FIG. 4 illustrates a two-dimensional image of a rendered scene, in an embodiment.

FIG. 4 illustrates a two-dimensional image 400 of virtual scene 300, in an embodiment. The image 400 illustrates virtual scene 300 as it would be rendered without applying a defocus operation to box 304. Boxes 304 and 306, and background 308, are fully opaque. When no color information is available in the image 400 for the portion of box 306 obscured by box 304, as described above, the renderer would effectively ignore parts of the scene that would not be visible in a rendered image. If a defocusing operation were performed to the box 304 post-rendering (e.g., during compositing), color information from the visible portions of box 306 surrounding box 304 could be used to determine an approximation of the color the obscured region of box 306. For simple objects like boxes 304 and 306, the result of defocusing box 304 post-rendering may be very similar to the result of defocusing box 304 during rendering. If, as in the example above, box 304 is a solid red color and box 306 is a solid blue color, then the visible region of box 306 is the same color (blue) as the obscured region of box 306. In that case, approximating the color of the obscured region of box 306 as blue would yield similar results to what would be obtained if the color of the obscured region were known, since the approximation would match the actual color exactly.

If the objects in the scene were more complex, however, a defocus operation performed post-rendering may yield very different results from one performed during rendering. For example, if box 304 was a tree and box 306 was a large building some distance from the tree, color information about the obscured portion of the building may be difficult to approximate. Pixels included in the tree may include varying degrees of transparency, and the tree may obscure walls, doors, windows, and decorative elements of the building, which may vary in color. For each pixel of the tree to be blurred, the defocus operation may compute a blend color based on the color of the pixel and the color of adjacent pixels and a transparency value. Since the blend color of pixels that should correspond to a combination of the color of the tree and the color of an obscured portion of the building is based off an approximation of the color of portions of the building obscured by the tree, visible artifacts may appear in the resulting image. Embodiments of the present disclosure eliminate or reduce the visibility of such artifacts, as described with respect to FIG. 8.

Figure 5:
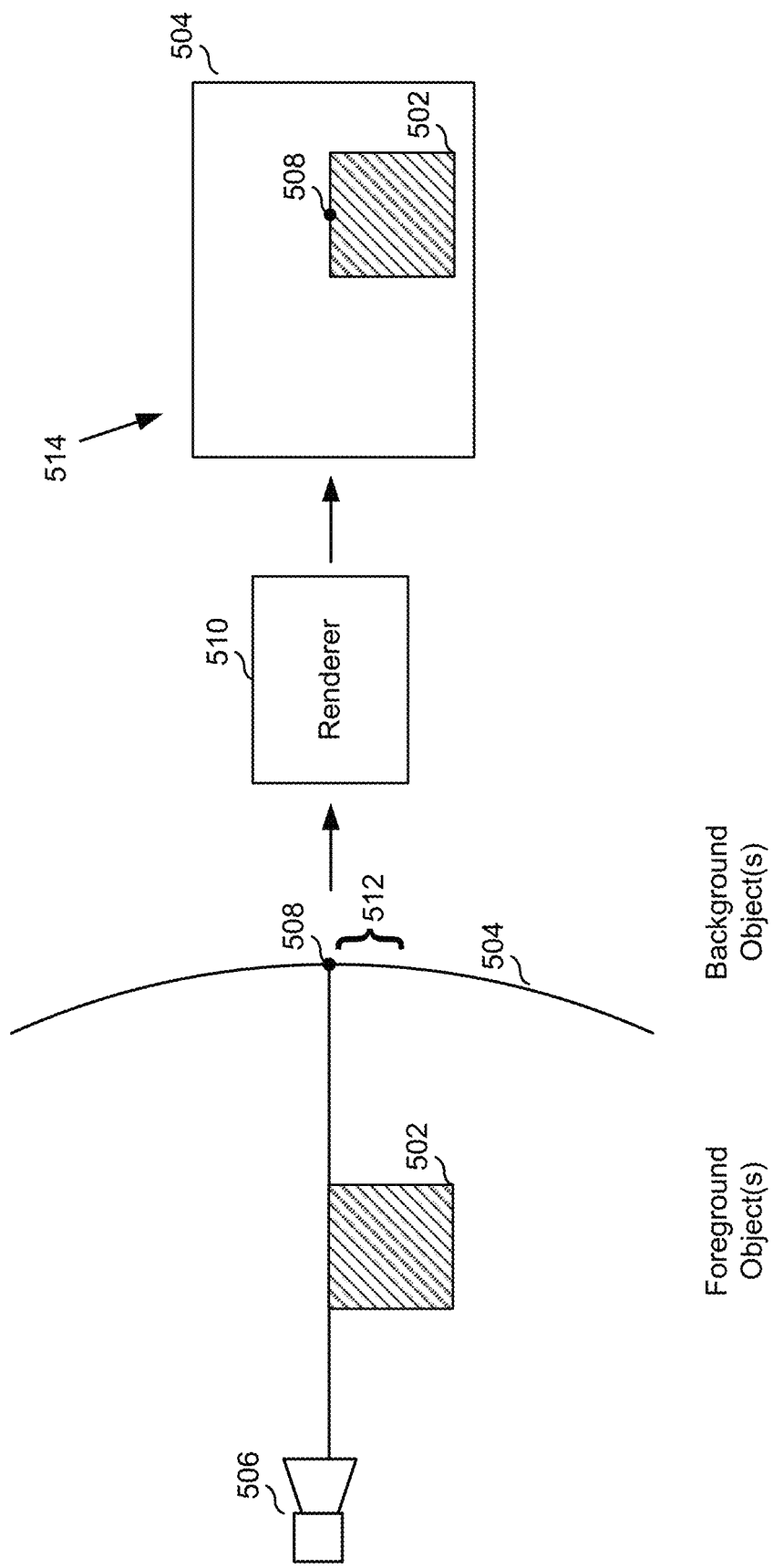
FIG. 5 illustrates another example of how objects might be processed for rendering.

FIG. 5 illustrates another example of how objects might be processed for rendering. As illustrated there, an object 502 is in a foreground of a scene relative to an object 504 that is in a background of the scene, relative to a virtual camera 506. A renderer 510 might process a scene description of objects, cameras, lights, etc. and their placement as in the left of FIG. 5 to form a rendered image 514. Note that a point 508 in the scene might be partially visible from the virtual camera 506 along an edge of object 502, but generally region 512 would not be part of rendered image 514, as region 512 would have been obscured by object 502 in the foreground.

In the example shown in FIG. 5, in a focused, rendered image, a light ray 522 connects point 508 of object 504 to pixel row 544 in pixel column 540 of virtual camera 506. Similarly, a light ray 524 connects point 534 to pixel row 544 in pixel column 540. However, light ray 526 does not connect point 536 with any pixel, because light ray 526 intersects virtual object 502. However, if the image is defocused during rendering, then pixel 542 may include color contributions not only from point 508, but also from points 534 and 536. Unfortunately, if the image is defocused post-rendering, then color information from point 536 may not be stored in the rendered image, and may thus not be available for color blending calculations, resulting in a visible color blending artifact, as shown for example in FIGS. 16 and 17.

Figure 6:
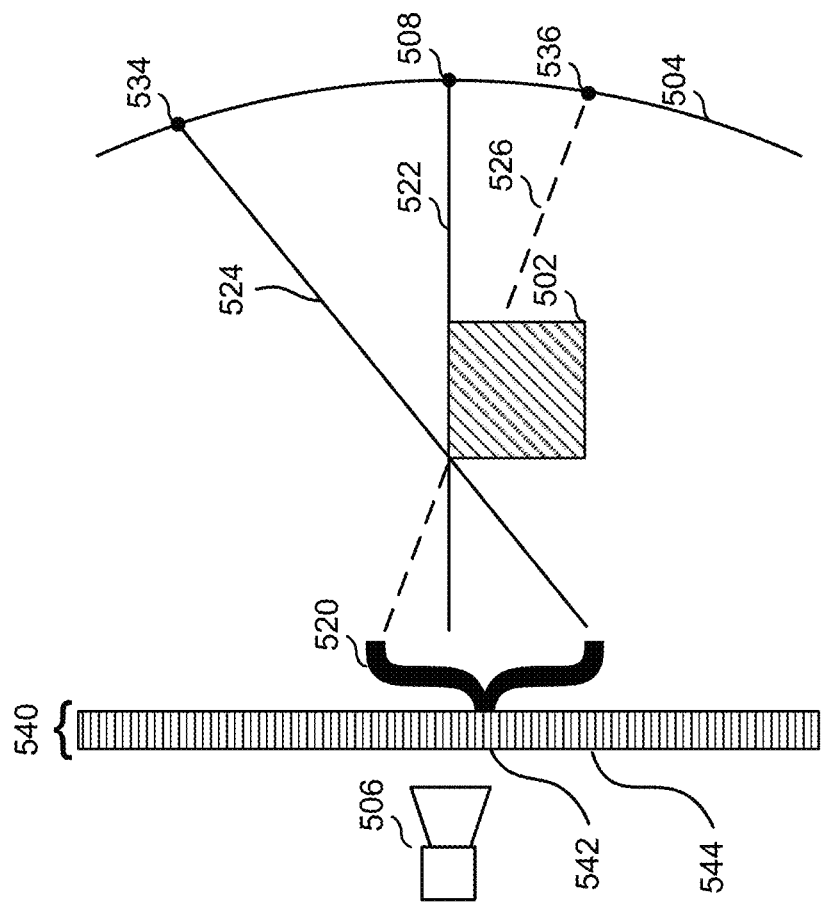
FIG. 6 illustrates an example of light rays as might occur when an object is out of focus.

FIG. 6 illustrates an example of light rays as might occur when an object is out of focus. The illustration is not necessarily to scale, so as to more clearly illustrate certain concepts. As shown there, when an edge of an object, or some other feature, is out of focus, light from different directions would impinge on an image pixel. In this example, light contributions 520 that are used to determine a pixel color value for a pixel 542 can arrive from different directions, as in ray 522, ray 524, and ray 526. Thus, a pixel of an image that depicts object 502 would have color contributions from object 502 along ray 522, point 534 along ray 524, and point 536 along ray 526. These can be summed or otherwise operated on to determine a pixel color value to store in a pixel array 540 for pixel 542. However, during rendering, details of point 536 might not be preserved if object 502 is opaque and was in focus during rendering. In effect, a contribution after blurring of object 502 would be missing. For other pixels, such as pixel 544, there might not be any contributions missing, if the spreading of ray directions due to defocusing are all coming from object 502, which has a known color or pattern.

Figure 7:
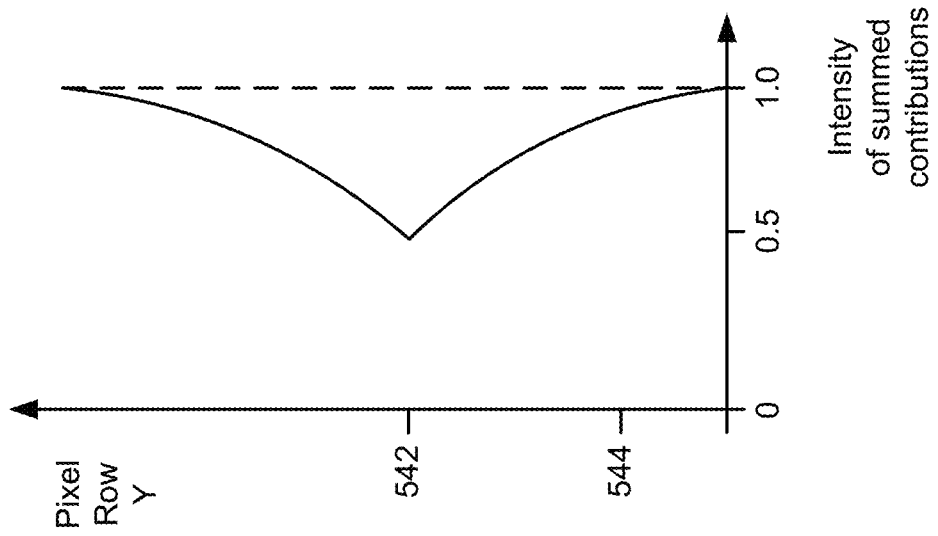
FIG. 7 is a plot illustrating the effect depicted in FIG. 6.

FIG. 7 is a plot illustrating the effect depicted in FIG. 6. As shown there, an intensity of summed contributions to pixel color values can be 1.0 when the spread of rays of contributions to a pixel's color value are known, as would be the case where a pixel's blur only covers visible objects, as might be the case near the center of the camera-facing face of object 502. An intensity of a sum of color values for pixel 542, being aligned with an edge of object 502 is lower, reflecting the fact that values for points on background 504 around point 536 are not available. Pixels below pixel 542, such as pixel are less affected as their color contributions come more from object 502 than from background 504, whereas pixels above pixel 542 are also less affected, but in that case because more of the portions of background 504 that contribute to those pixels are available.

Figure 8:
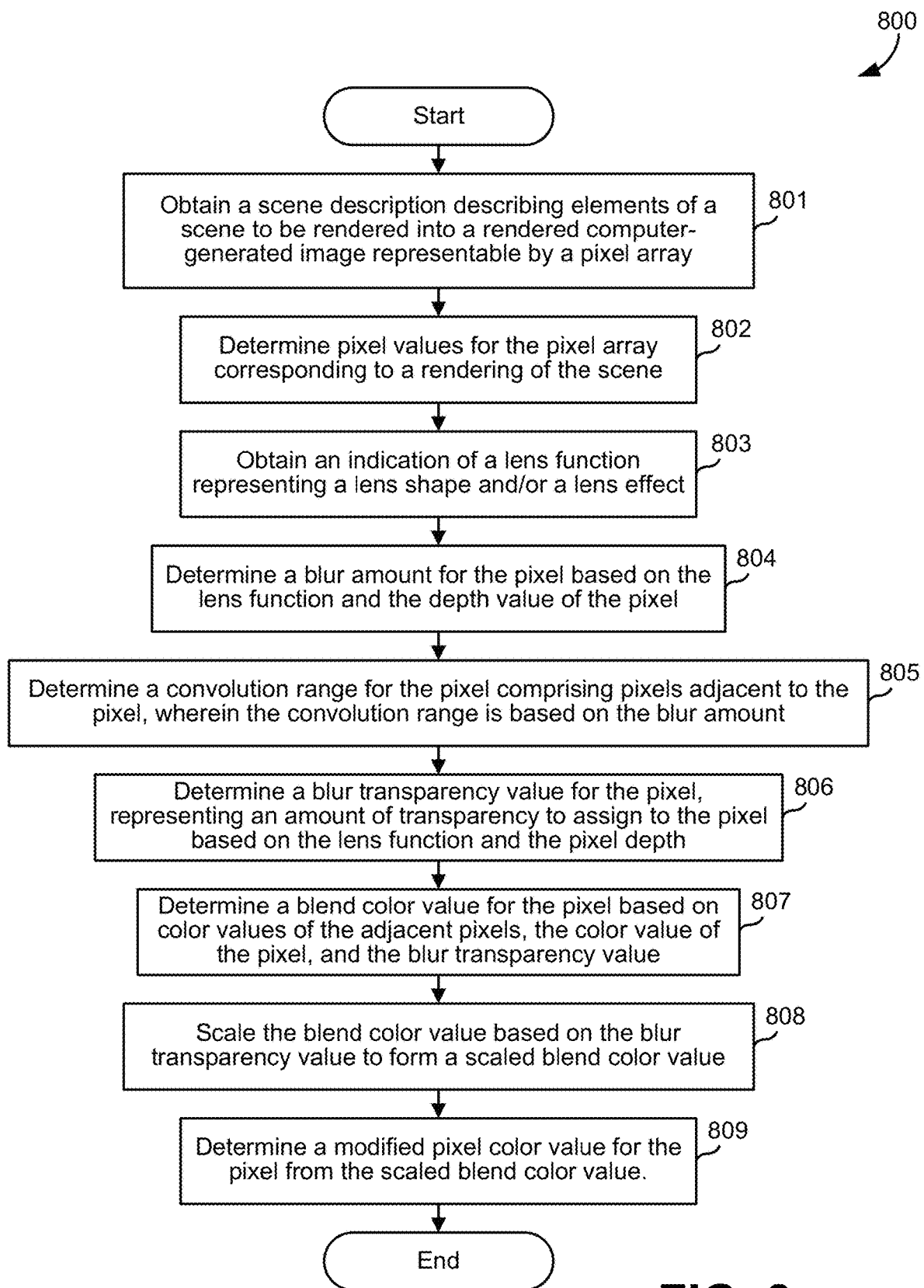
FIG. 8 is a flowchart of an exemplary method for defocusing a sharp rendered image, in an embodiment.

FIG. 8 is a flowchart of an exemplary method 800 as might be performed by an image processor to defocus a sharp rendered image. Note that one or more of the steps of method 800 may be combined, omitted, or performed in a different order in different embodiments.

In step 801, the image processor might obtain a scene description describing elements of a scene to be rendered into a rendered computer-generated image representable by a pixel array.

In step 802, the image processor might determine, from the scene description, pixel values for the pixel array corresponding to a rendering of the scene. The pixel array may comprise a plurality of pixel data elements, with a pixel data element of a pixel of the pixel array including a color value, an alpha value, and a depth value. The color value may for example be represented by component red, green, and blue (RGB) values. The alpha value may represent the degree of transparency of the pixel, for example, on a scale from 0.0 to 1.0, where a pixel with an alpha value of 0.0 is completely transparent and a pixel with an alpha value of 1.0 is completely opaque. The depth value may correspond to the distance between a virtual camera and the face of the object represented by the pixel. The pixel data element may be associated with an image position representing a position of the pixel in the rendered computer-generated image.

In step 803, the image processor may obtain an indication of a lens function, wherein a lens function represents a lens shape (e.g., circular, hexagonal, or a different shape) and/or a lens effect (e.g., chromatic aberration, warping, fisheye, etc.). The lens shape may correspond to an aperture shape in a physical camera lens (e.g., the lens which would produce the defocus effect the image processor is emulating).

In step 804, the image processor may determine, for the pixel, a blur amount based on the lens function and the depth value of the pixel. The blur amount may indicate how much a region is to be blurred and may be specified as a number of pixels.

In step 805, the image processor may determine, for the pixel, a convolution range comprising adjacent pixels adjacent to the pixel, wherein the convolution range is based on the blur amount. The convolution range may define the dimensions of a two-dimensional matrix of adjacent pixels to be considered when determining a blend color for the pixel. For example, the convolution range may be defined as twice the number of pixels indicated by the blur amount on each side. For a blur amount of +/−5 pixels, the convolution range may be 20 pixels, and the blend color for the pixel will be determined based on a 20×20 pixel region surrounding the pixel.

In step 806, the image processor may determine, for the pixel, a blur transparency value representing an amount of transparency to assign to the pixel based on the lens function and the pixel depth. The blur transparency value may, like the alpha value, be a number between 0.0 to 1.0, where 0.0 represents complete transparency and 1.0 represents complete opacity. In some embodiments, the pixel data element may further include the blur transparency value (e.g., the blur transparency value may be stored in the pixel data element once the value has been computed).

In step 807, the image processor may determine, for the pixel, a blend color value based on color values of the adjacent pixels (e.g., the adjacent pixels indicated by the convolution range), the color value of the pixel, and the blur transparency value. For example, to obtain the blend color for the pixel, the image processor may perform a convolution between a blur kernel and a region of pixels with the pixel at the center, where the size of the region is defined by the convolution range. For example, the blur kernel may be a circle of any radius. Based on the blur kernel and an image, the image processor may precompute a set of convolution kernels of fixed radii (e.g., in steps of 0.1 pixels) with which to perform the convolution. In some embodiments, the image processor may adjust for the alpha value and the blur transparency value as part of determining the blend color value. For example, the image processor may read the pixel's alpha value from the pixel element and multiply the alpha value by the blend color value and the blur transparency to obtain an adjusted blend color value. The image can be from a photograph or from a computer-generated image. The blur kernel can be generated by a computer process based on some underlying rules, such as generating a polygon with some specified number of sides and a specified or arbitrary curvature. In some embodiments, the blur kernel itself is extracted from a photograph.

In step 808, the image processor may scale the blend color value based on the blur transparency value to form a scaled blend color value. The scaled blend color value may correspond to the predicted value of blending the color value of the pixel with the color value of any background object(s) which are not visible in the rendered computer-generated image. In some embodiments, the blend color value may be scaled by multiplying pixel color component values by a scaling factor, S, that is computed as $S=1/(1-H)$ wherein H represents a proportion (less than 1.0) of a background object that would contribute—if it were available—to the blend color value but is not available because it is obscured by a foreground object. For example, if the blend color value is (73, 176, 44, 0.8), where 73 is the red component, 176 is the green component, 44 is the blue component, and 0.8 is the alpha value (in this case, the blur transparency value), and subtracting the blur transparency value from 1 is the blur transparency value (in this example, 0.2) would represent the proportion of the background object that would contribute the blend color were it not obscured by the foreground object. S would then equal 1/(1-0.2), or 1.25, and the scaled blend color value would be (91, 220, 55, 1.0). Effectively, the intensity of the blend color value is scaled so that the alpha value becomes 1.0.

At step 809, the image processor may determine, for the pixel, a modified pixel color value from the scaled blend color value. For example, the modified pixel color value may be equal to the scaled blend color value.

In some embodiments, the image processor may perform edge detection to detect edges of image elements in the rendered computer-generated image and pre-compute a per-pixel blur transparency map from detected edges. The image processor may generate a mask based on the edge detection, then generate the blur transparency map based on the mask (e.g., by defining a region along each detected edge based on the depth of the pixels along the detected edges). The blur transparency map may indicate regions of the image that unintentionally include transparency (e.g., where the transparency is an artifact of the method 800), and any pixels within the indicated regions should have their blend color values scaled. For example, the image processor may estimate where the defocusing process will introduce unwanted artifacts in the rendered image, and exclude other portions (e.g., portions of the image where pixels are to retain their transparency) in the blur transparency map so pixels that are not part of the unwanted artifacts are not corrected by having their blend color values scaled. In some embodiments, the image processor may instead pre-compute the per-pixel blur transparency map from the scene description.

FIG. 9 illustrates an image 900 with a vignette effect, in an embodiment. The image 900 includes multiple out-of-focus points of light, e.g., points 902 and 904. The outer edges of the image 900 appear darker than the center of the image 900, which on a physical camera may be caused by light blockage from the lens barrel and/or hood, along with properties of the aperture and lens. As a result of the vignette effect, out-of-focus points of light near the center of the image 200 may appear round (e.g., if the aperture is round in a physical camera, or a lens equation indicates a round lens in a virtual camera), but points further from the center of the image 200 may appear flattened. For example, point 902 close to the center of the image 900 appears round, but point 904 closer to edge of the image 900 appears elliptical. It may be desirable to emulate the vignette effect in an image rendered from a virtual scene, post-rendering, for the same reasons described above for the defocusing. For example, a change to a vignette effect applied during rendering may require rendering the scene again, which can be computationally expensive. It may also be desirable to remove or omit darkening near the edges of the image 900 caused by vignetting as might occur, and optionally add the darkening back in later in the editing process. In some cases, a pixel might be otherwise affected by defocus darkening and by the cutting off of a bokeh for vignetting. Both of these can be adjusted by the scaling described herein.

FIG. 10 illustrates a technique 1000 for achieving a vignette effect, in an embodiment. The technique 1000 allows a vignette effect to be applied post-rendering, while separating the process of adding the darkening effect near the edges of an image from the shaping of elements (e.g., the points of light 902 and 904 in image 900). In the example shown, two images can be used, a kernel image 1010 and a control image 1020. The kernel image 1010 defines a shape 1012 corresponding to the desired shape of elements near the center of the image, and the control image 1020 defines a shape 1022 used in combination with the kernel image 1010 to control the shape of defocus of each pixel in an image. For example, the kernel image 1010 and control image 1020 may be multiplied along with a shift as illustrated in image 1030. The region 1032 where portions of the kernel shape 1012a and the control shape 1022a overlap during the multiply operations may define the shape of elements in that region of an image. For example, an element at the bottom left of an image (e.g., point 904 in image 900) may be shaped during a defocus operation to match the shape of the region 1032.

Aspects of the technique 1000 may also be used to avoid or remove the darkening effect at the edges of an image during vignetting. An image processor may pre-compute how much light would be lost during application of the vignetting effect and adjust the brightness of affected areas of the image using a vignetting factor based on the amount of light lost by vignetting to remove the darkening effect. The vignetting factor may be determined based on the difference between the area of the kernel shape 1012a and the area of the region 1032 where the kernel shape 1012a and control shape 1022 overlap. For example, the vignetting factor, V, may be computed as the area of the overlapping region 1032 divided by the area of the kernel shape 1012a. The color value of each pixel in the image corresponding to the overlapping region 1032 (e.g., point of light 932 of image 900) darkened by the vignetting may then be multiplied by an intensity compensation value equal to $1/(1-V)$.

Figure 11:
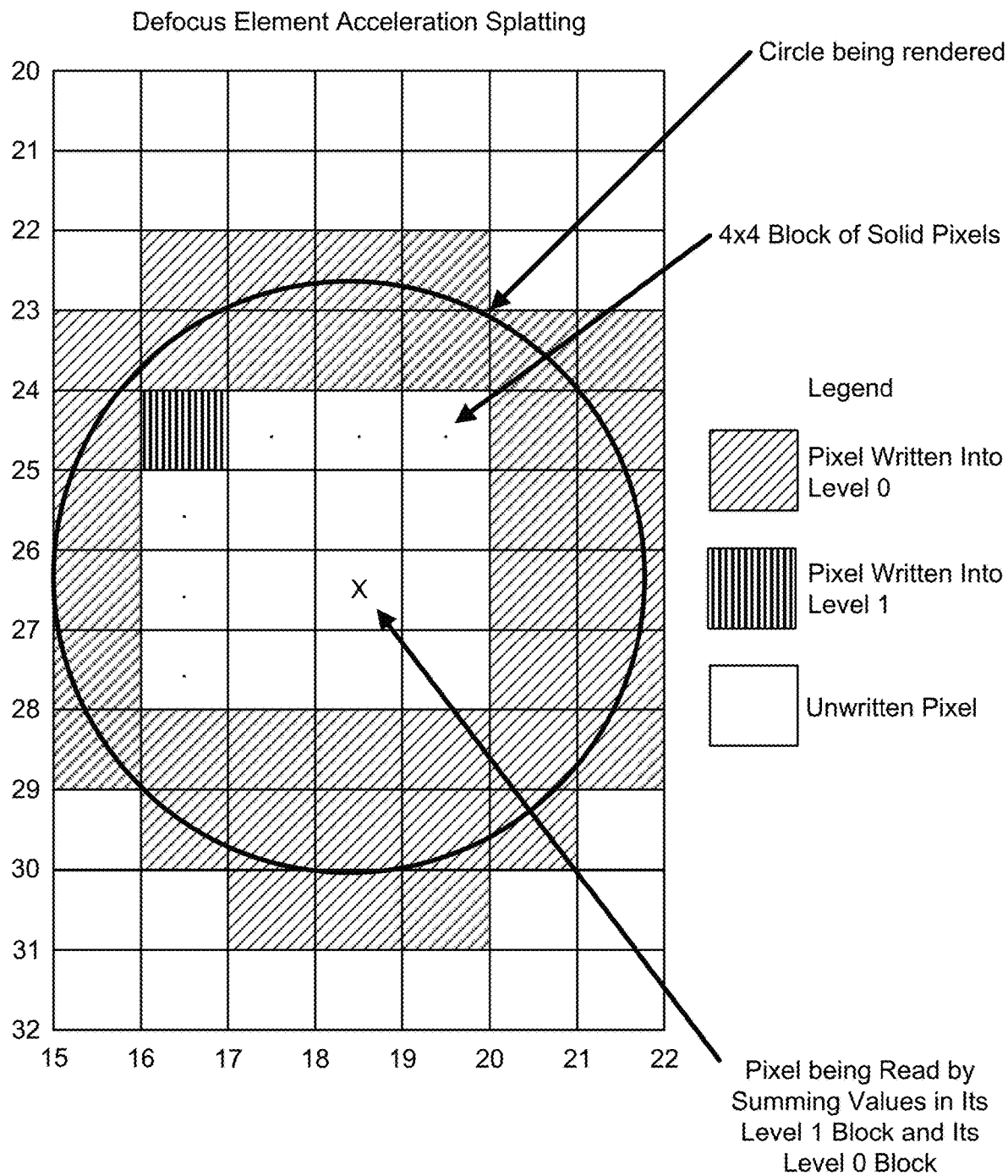
FIG. 11 illustrates part of a process of pixel processing for defocus element acceleration splatting.

FIG. 11 illustrates part of a process of pixel processing for defocus element acceleration splatting. As illustrated there, a circle is to be rendered to the pixel array shown. Some of the pixels will be Level 0 pixels and some will be Level 1 pixels, as in the pixel at X=16, Y=24 in the pixel array shown in FIG. 11. Splats of the circle are summed to an output buffer. If the circle contains a block of 4×4 pixels (as it does in the example shown), and those pixels are all solid (e.g., having the same color value and alpha value) and grid-aligned, a single write happens into a Level 1 block instead of a Level 0 block.

FIG. 11 illustrates a two-level structure of a buffer that can be used to accelerate splatting. This can help accelerate the processing of pixels, as each source pixel might be processed by a process that needs to write out values for many output pixels. In the example shown, there are 54 pixels to be accumulated. However, in the middle of the circle being rendered, there is a block of 4×4 pixels that are all solid and that block happens to be aligned with pixel positions that are multiples of four. So instead of summing up 16 pixels, the processor can just sum one pixel. In an implementation, there are two images, one that is the higher resolution and one that is a lower resolution of $\frac{1}{16}$th the size. When reading out pixel values, the process can add results for the two images together.

In some implementations, this shortcut is only used for a solid block of interior pixels, that are aligned. In the example of FIG. 11, all pixels from 16.24 to 20.28 are solid so the process can use this shortcut. If only the block from 17.24 to 21.28 were solid, the process might not use the shortcut.

Figure 12:
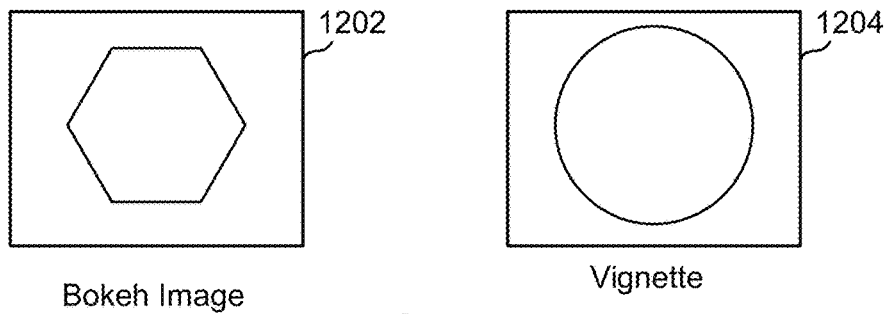
FIG. 12 illustrates examples of a bokeh image and a vignette mask.

FIG. 12 illustrates examples of a bokeh image 1202, representing a selected or obtained light-blurring pattern (in this example, a hexagon), and a vignette mask 1204. These might be inputs to a lemoning process. As the lemoning process slides the bokeh against the vignette mask, the result is as shown in FIG. 13.

Figure 13:
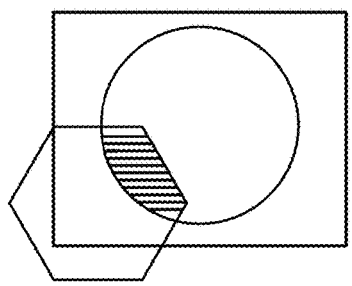
FIG. 13 illustrates a new bokeh convolution kernel.

FIG. 13 illustrates a new bokeh convolution kernel. The direction and amount of sliding might depend on coordinates of a pixel in an image.

Figure 14:
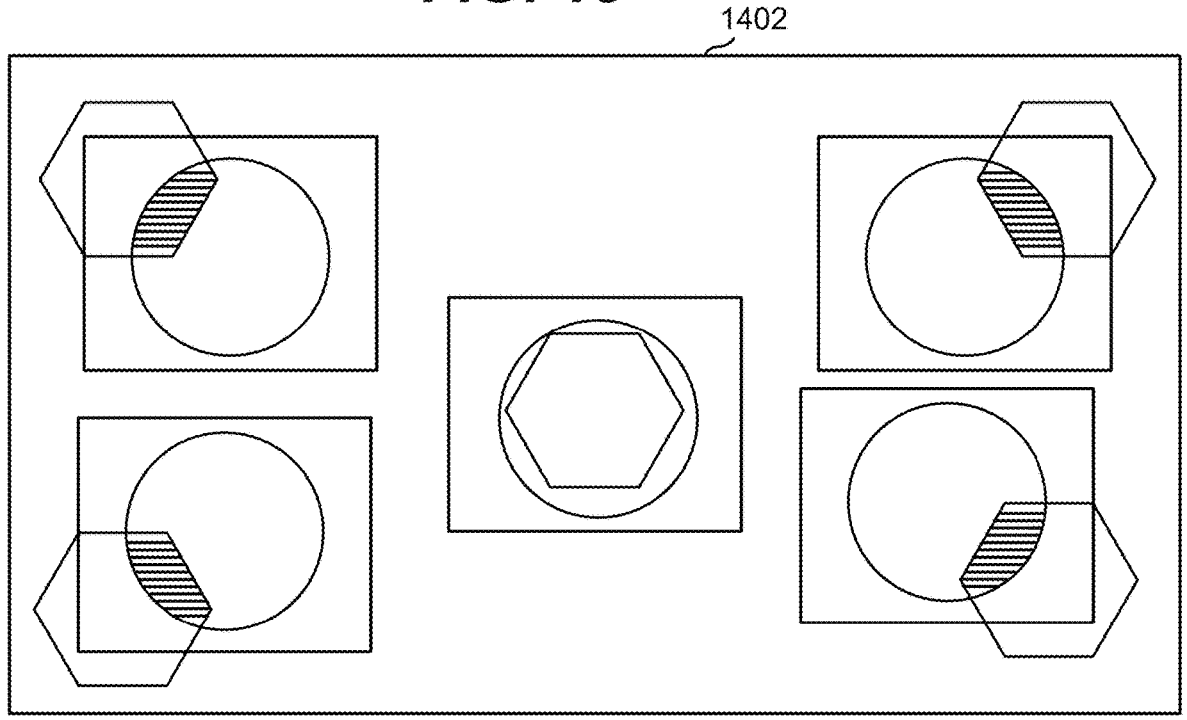
FIG. 14 illustrates the sliding of FIG. 13.

FIG. 14 illustrates the sliding of FIG. 13. Note that the vignette mask and the bokeh image are aligned for the center of an image 1102.

Figure 15:
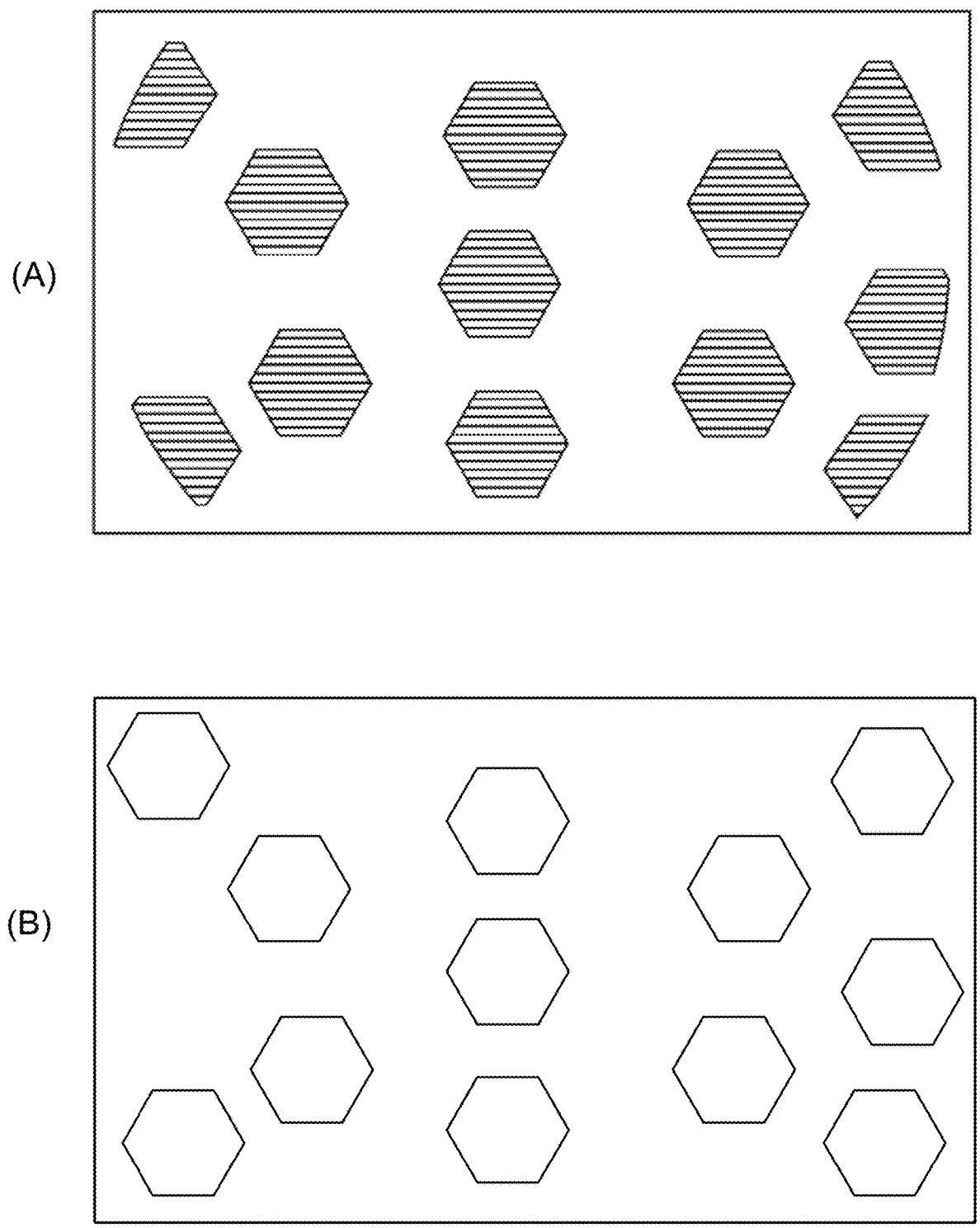
FIG. 15 illustrates result of lemoning being on (FIG. 15(A)) and lemoning being off (FIG. 15(B)).

FIG. 15 illustrates an end result with lemoning on (FIG. 15(A)), while FIG. 15(B) illustrates a result with lemoning off (which is just the bokeh pattern for out-of-focus lights. Lemoning is sometimes referred to as cat's eye bokeh or the Petzval effect.

Figure 16:
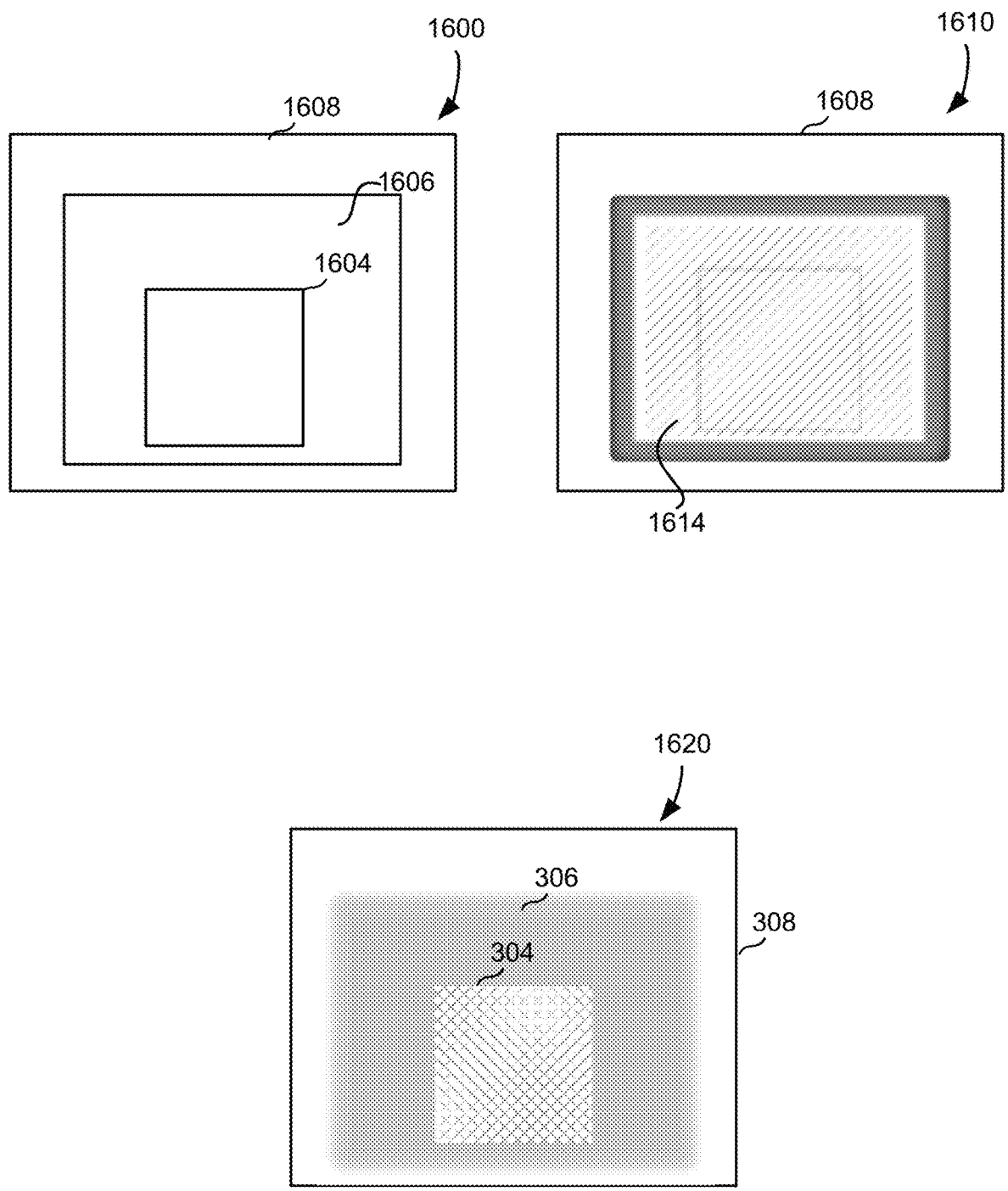
FIG. 16 illustrates the creation of a blur transparency map.

FIG. 16 illustrates the creation of a blur transparency map 1610 for rendered image 400 of FIG. 4. Here, box 306 (behind box 304 and before background 308) is to be defocused. As described in FIGS. 3 and 4, the image 400 may not include color information for the portion of box 306 obscured by box 304, nor of the portion of background 308 obscured by box 306. Defocusing box 306 may introduce unwanted transparency (also referred to as artifacts) to pixels. The artifacts should be corrected (e.g., through method 800) while leaving other pixels with intentional transparency untouched. An image processor may create a blur transparency map 1610 to protect intentionally-transparent pixels of image 400 while correcting artifacts of the defocusing process.

The image processor may first perform edge detection and produce an image 1600 that includes raw alpha channel output from the image 400 during the defocusing process. Region 1604 represents box 304, region 1606 represents box 306, and region 1608 represents background 308. The dark areas of the image 1600 represent pixels that include transparency, both intentionally (e.g., as a result of softening the edges of box 306) and as an unintended result of the defocusing process, with darker areas corresponding to a higher degree of transparency than less dark areas. For example, the dark area outside of region 1606 may be the intentional result of the defocusing process and should not be corrected. The dark area around region 1604, however, may be an unintended artifact introduced during the defocusing process that should be corrected. For example, while defocusing box 306, unintentional transparency may have been introduced around box 304 because of missing color information caused by box 304 obscuring box 306. The image processor may create a mask 1614 (represented here as a region filled with diagonal lines) to designate areas of the image 1600 that may contain artifacts that should be corrected, resulting in blur transparency map 1610. When the image processor blends color values for pixels as described with respect to method 800, it will exclude pixels outside the mask 1614. The result of defocusing box 306 is illustrated in image 1620. As illustrated in image 1620, the transparent area around box 304 introduced as part of defocusing box 306 has been removed, but the transparent area along the outside of box 306 (giving box 306 a softened appearance) has been preserved.

Figure 17:
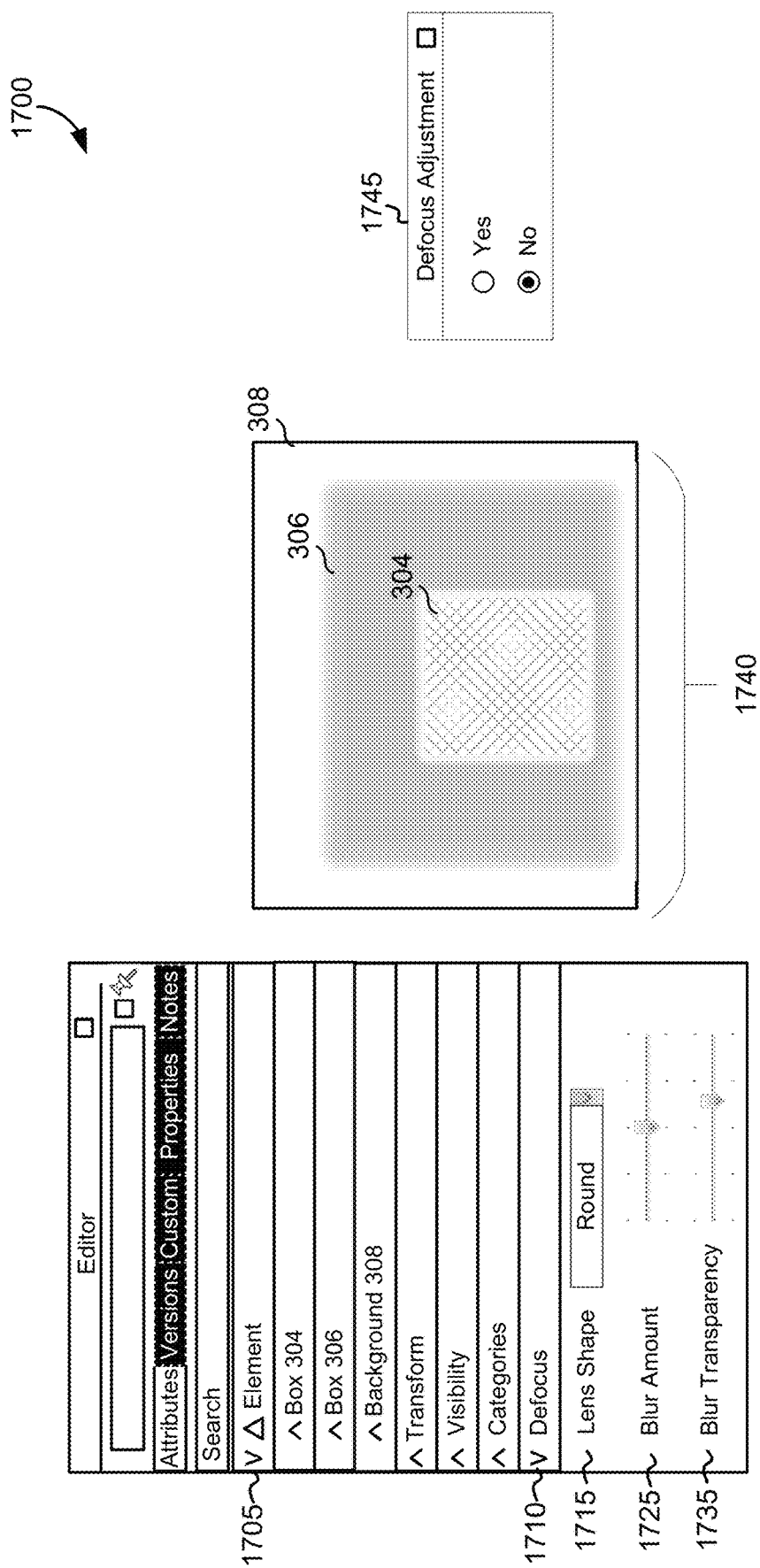
FIG. 17 illustrates an example user interface (UI) for performing defocus operations, according to various embodiments.

FIG. 17 illustrates an example UI 1700 for performing defocus operations, according to various embodiments. In this example, box 306 of FIG. 3 is being defocused. The UI 1700 includes a presentation element 1705 for displaying information regarding elements of a scene rendered onto an image (e.g., the image in display 1740). The presentation element 1705 may include a listing of the various objects or elements in the scene, and each individual object or element may be expanded to reveal details about the object or element (e.g., size, position, color, etc.).

The UI 1700 also includes presentation elements 1710, 1715, 1725, and 1735 for defining and performing defocus operations on an image (e.g., the image in display 1740). Presentation element 1715 may allow a user to select a lens shape and/or lens effect to apply when performing defocus operations. Presentation element 1725 may allow a user to select a blur amount, and presentation element 1735 may allow user to select a blur transparency amount. An image processor may use input received from the blur amount element 1725 and the blur transparency element 1735 to determine a convolution range. Collectively, presentation elements 1710, 1715, 1725, and 1735 may be used to define a lens function.

The UI 1700 also includes a display 1740 for displaying an image (e.g., the image produced by the defocus operation). The display 1740 may be updated as parameters (e.g., the lens shape, blur amount, blur transparency, etc.) are updated by the user.

The UI 1700 also includes an element or selector 1745 for indicating whether the image should be adjusted to correct for artifacts (during or after a defocus operation), as described with respect to FIG. 16. Here, the defocus adjustment has been disabled, resulting in unintended transparency artifacts surrounding box 304.

Figure 18:
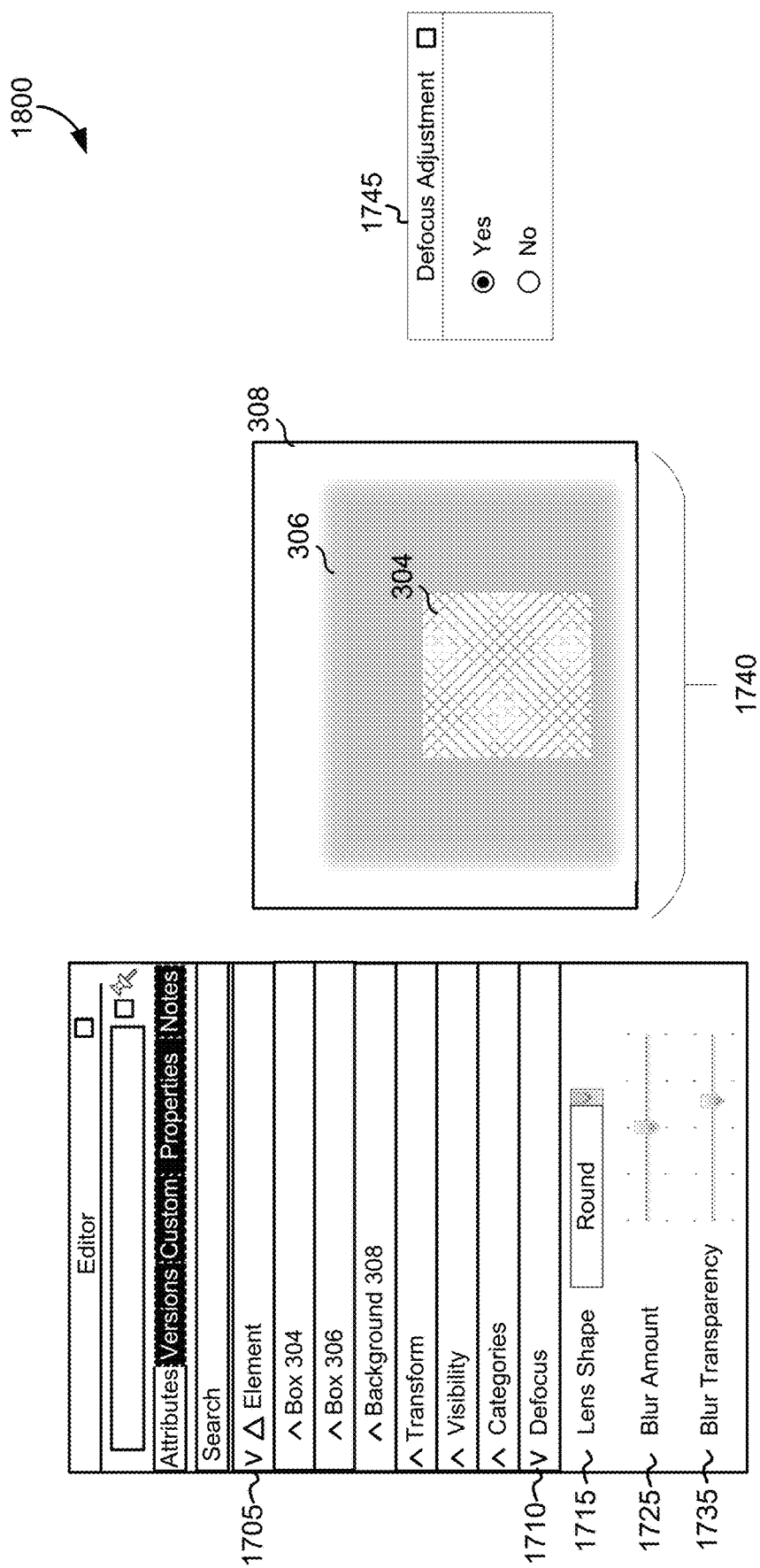
FIG. 18 illustrates an example UI for performing defocus operations, according to various embodiments.

FIG. 18 illustrates an example UI 1800 for performing defocus operations, according to various embodiments. The UI 1800 is the same as UI 1700, except that the defocus adjustment option presented in presentation element 1745 has been enabled. As a result, the transparency artifacts surrounding box 304 in FIG. 17 have been removed, for example, through the operations described with respect to FIGS. 8 and 16.

While FIGS. 17 and 18 illustrate specific UI controls for different presentation elements (e.g., slider controls for presentation elements 1725 and 1735), the UI controls illustrated are solely examples, and other UI controls (e.g., text boxes for presentation elements 1725 and 1735) as possible.

Figure 19:
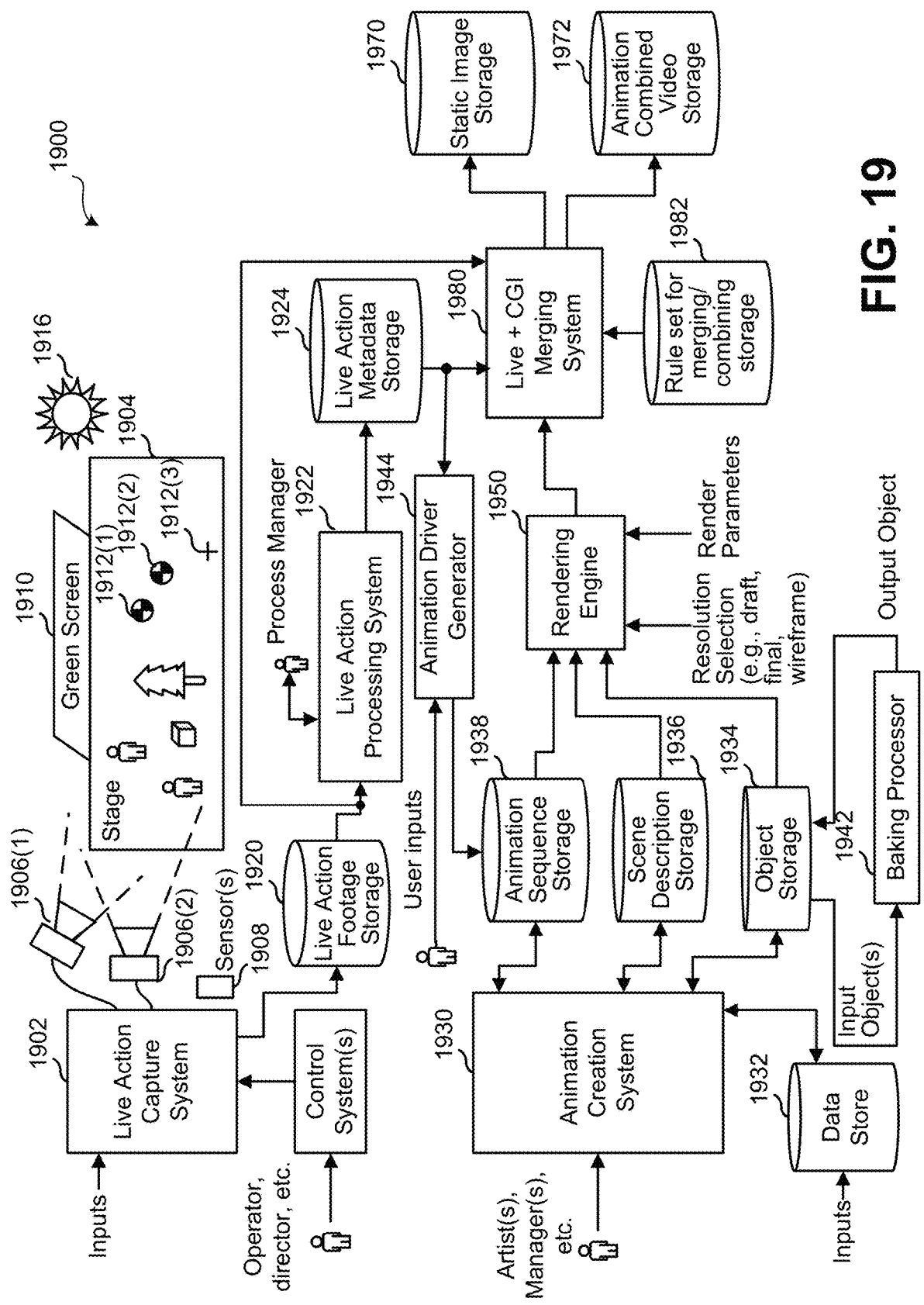
FIG. 19 illustrates an example visual content generation system as might be used to generate imagery in the form of still images and/or video sequences of images, according to various embodiments.

For example, FIG. 19 illustrates the example visual content generation system 1900 as might be used to generate imagery in the form of still images and/or video sequences of images. Visual content generation system 1900 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 1900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1700 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other)

and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 19, a live action capture system 1902 captures a live scene that plays out on a stage 1904. Live action capture system 1902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1906(1) and 1906(2) capture the scene, while in some systems, there might be other sensor(s) 1908 that capture information from the live scene (e.g., infrared cameras, infrared sensors, motion capture ("mo-cap") detectors, etc.). On stage 1904, there might be human actors, animal actors, inanimate objects, background objects, and possibly an object such as a green screen 1910 that is designed to be captured in a live scene recording in such a way that it is easily overlaid with computer-generated imagery. Stage 1904 might also contain objects that serve as fiducials, such as fiducials 1912(1)-(3), that might be used post-capture to determine where an object was during capture. A live action scene might be illuminated by one or more lights, such as an overhead light 1914.

During or following the capture of a live action scene, live action capture system 1902 might output live action footage to a live action footage storage 1920. A live action processing system 1922 might process live action footage to generate data about that live action footage and store that data into a live action metadata storage 1924. Live action processing system 1922 might include computer processing capabilities, image processing capabilities, one or more processors, program code storage for storing program instructions executable by the one or more processors, as well as user input devices and user output devices, not all of which are shown. Live action processing system 1922 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1914, as that might be useful in post-processing to match computer-generated lighting on objects that are computer-generated and overlaid on the live action footage. Live action processing system 1922 might operate autonomously, perhaps based on predetermined program instructions, to generate and output the live action metadata upon receiving and inputting the live action footage. The live action footage can be camera-captured data as well as data from other sensors.

An animation creation system 1930 is another part of visual content generation system 1900. Animation creation system 1930 might include computer processing capabilities, image processing capabilities, one or more processors, program code storage for storing program instructions executable by the one or more processors, as well as user input devices and user output devices, not all of which are shown. Animation creation system 1930 might be used by animation artists, managers, and others to specify details, perhaps programmatically and/or interactively, of imagery to be generated. From user input and data from a database or other data source, indicated as a data store 1932, animation creation system 1930 might generate and output data representing objects (e.g., a horse, a human, a ball, a teapot, a cloud, a light source, a texture, etc.) to an object storage 1934, generate and output data representing a scene into a scene description storage 1936, and/or generate and output data representing animation sequences to an animation sequence storage 1938.

Scene data might indicate locations of objects and other visual elements, values of their parameters, lighting, camera location, camera view plane, and other details that a rendering engine 1950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1930 might be interactive, allowing a user to read in animation sequences, scene descriptions, object details, etc. and edit those, possibly returning them to storage to update or replace existing data. As an example, an operator might read in objects from object storage into a baking processor 1942 that would transform those objects into simpler forms and return those to object storage 1934 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1932 might be used to drive object presentation. For example, if an artist is creating an animation of a spaceship passing over the surface of the Earth, instead of manually drawing or specifying a coastline, the artist might specify that animation creation system 1930 is to read data from data store 1932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1944 might read in live action metadata, such as data representing movements and positions of body parts of a live actor during a live action scene. Animation driver generator 1944 might generate corresponding animation parameters to be stored in animation sequence storage 1938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1922. Animation driver generator 1944 might convert that movement data into specifications of how joints of an articulated CGI character are to move over time.

A rendering engine 1950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1950 might include computer processing capabilities, image processing capabilities, one or more processors, program code storage for storing program instructions executable by the one or more processors, as well as user input devices and user output devices, not all of which are shown.

Visual content generation system 1900 can also include a merging system 1960 that merges live footage with animated content. The live footage might be obtained and input by reading from live action footage storage 1920 to obtain live action footage, by reading from live action metadata storage 1924 to obtain details such as presumed segmentation in captured images segmenting objects in a live action scene from their background (perhaps aided by the fact that green screen 1910 was part of the live action scene), and by obtaining CGI imagery from rendering engine 1950.

A merging system 1960 might also read data from rulesets for merging/combining storage 1962. A very simple example of a rule in a ruleset might be "obtain a full image including a two-dimensional pixel array from live footage, obtain a full image including a two-dimensional pixel array from rendering engine 1950, and output an image where each pixel is a corresponding pixel from rendering engine 1950 when the corresponding pixel in the live footage is a specific color of green, otherwise output a pixel value from the corresponding pixel in the live footage."

Merging system 1960 might include computer processing capabilities, image processing capabilities, one or more processors, program code storage for storing program instructions executable by the one or more processors, as well as user input devices and user output devices, not all of which are shown. Merging system 1960 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1960, such as modifying boundaries of segmented objects, inserting blurs to smooth out imperfections, or adding other effects. Based on its inputs, merging system 1960 can output an image to be stored in a static image storage 1970 and/or a sequence of images in the form of video to be stored in an animated/combined video storage 1972.

Thus, as described, visual content generation system 1900 can be used to generate video that combines live action with computer-generated animation using various components and tools, some of which are described in more detail herein. While visual content generation system 1900 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 20:
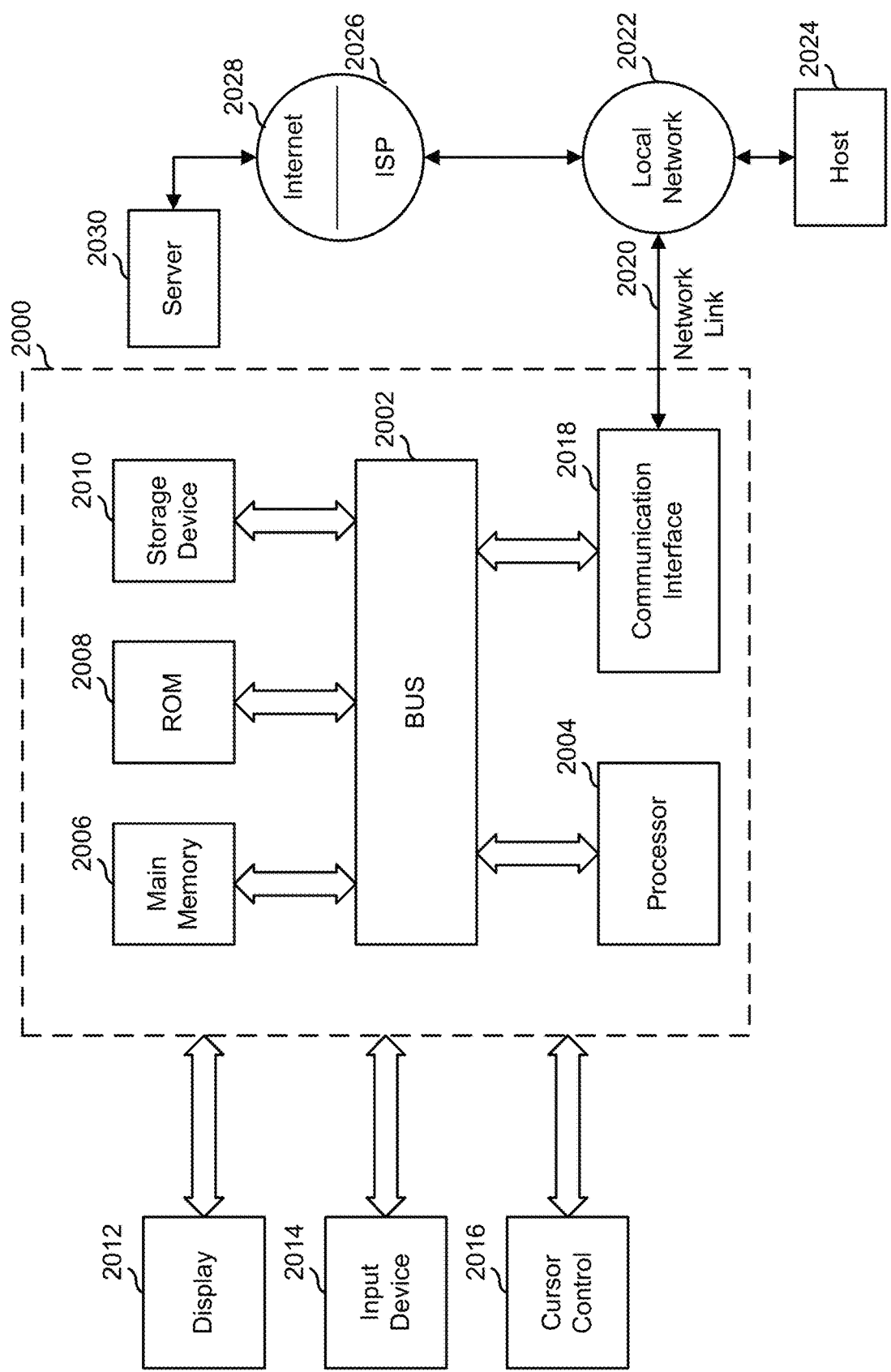
FIG. 20 is a block diagram illustrating an example computer system upon which computer systems of the systems illustrated in FIGS. 1 and 19 may be implemented.

For example, FIG. 20 is a block diagram that illustrates a computer system 2000 upon which the computer systems of the systems described herein and/or visual content generation system 1900 (see FIG. 19) may be implemented. Computer system 2000 includes a bus 2002 or other communication mechanism for communicating information, and a processor 2004 coupled with bus 2002 for processing information. Processor 2004 may be, for example, a general-purpose microprocessor.

Computer system 2000 also includes a main memory 2006, such as a random-access memory (RAM) or other dynamic storage device, coupled to bus 2002 for storing information and instructions to be executed by processor 2004. Main memory 2006 may also be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk or optical disk, is provided and coupled to bus 2002 for storing information and instructions.

Computer system 2000 may be coupled via bus 2002 to a display 2012, such as a computer monitor, for displaying information to a computer user. An input device 2014, including alphanumeric and other keys, is coupled to bus 2002 for communicating information and command selections to processor 2004. Another type of user input device is a cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 2010. Volatile media includes dynamic memory, such as main memory 2006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid-state drive of a remote computer. The remote computer can load the instructions into its dynamic memory and send the instructions over a network connection. A modem or network interface local to computer system 2000 can receive the data. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be a network card, a modem, a cable modem, or a satellite modem to provide a data communication connection to a corresponding type of telephone line or communications line. Wireless links may also be implemented. In any such implementation, communication interface 2018 sends and receives electrical, electromagnetic, or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world-wide packet data communication network now commonly referred to as the "Internet" 2028. Local network 2022 and Internet 2028 both use electrical, electromagnetic, or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020, and communication interface 2018. In the Internet example, a server 2030 might transmit a requested code for an application program through the Internet 2028, ISP 2026, local network 2022, and communication interface 2018. The received code may be executed by processor 2004 as it is received, and/or stored in storage device 2010, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing image data that includes depth information, the method comprising: under the control of one or more computer systems configured with executable instructions:
obtaining a scene description describing elements of a scene to be rendered into a rendered computer-generated image representable by a pixel array;
determining, from the scene description, pixel values for the pixel array corresponding to a rendering of the scene, the pixel array comprising a plurality of pixel data elements including a pixel data element of a pixel of the pixel array includes a pixel color value, a pixel alpha value, and a pixel depth value, wherein the pixel data element has associated therewith an image position representing a position of the pixel in the rendered computer-generated image;
obtaining an indication of a lens function, wherein the lens function represents a lens shape and/or a lens effect;
determining, for the pixel, a blur amount based on the lens function and the pixel's pixel depth value;
determining, for the pixel, a convolution range comprising adjacent pixels adjacent to the pixel, wherein the convolution range is based on the blur amount;
determining, for the pixel, a blend color value based on color values of the adjacent pixels, the pixel's pixel color value, and a blur transparency value;
scaling the blend color value based on the blur transparency value to form a scaled blend color value; and
determining, for the pixel, a modified pixel color value from the scaled blend color value.

2. The computer-implemented method of claim 1, wherein the blur transparency value represents an amount of transparency to assign to the pixel data element based on the lens function and the pixel data element's pixel depth value and wherein the blur transparency value is stored as a component of the pixel data element.

3. The computer-implemented method of claim 1, further comprising adjusting, for the pixel alpha value of the pixel and the blur transparency value as part of determining the blend color value.

4. The computer-implemented method of claim 1, wherein scaling the blend color value comprises multiplying pixel color component values by a scaling factor, S, that is computed as $S=1/(1-H)$ wherein H represents a proportion of a background object that would contribute to the blend color value but is obscured by a foreground object.

5. The computer-implemented method of claim 1, further comprising pre-computing a per-pixel blur transparency map from the scene description.

6. The computer-implemented method of claim 1, further comprising performing edge detection to detect detected edges of image elements in the rendered computer-generated image.

7. The computer-implemented method of claim 6, further comprising pre-computing a per-pixel blur transparency map from at least some of the detected edges.

8. The computer-implemented method of claim 6, further comprising generating a mask based on the detected edges.

9. The computer-implemented method of claim 8, further comprising determining blend colors only for pixels located within the mask.

10. The computer-implemented method of claim 8, further comprising generating a per-pixel blur transparency map based on the mask.

11. The computer-implemented method of either claim 7 or claim 10, further comprising determining the blur transparency value based on the per-pixel blur transparency map.

12. The computer-implemented method of claim 1, wherein the pixel color value comprises a plurality of color components.

13. The computer-implemented method of claim 1, wherein the modified pixel color value is equal to the scaled blend color value.

14. The computer-implemented method of claim 1, further comprising splatting the pixel across a region of nearby pixels within a circular radius, such that the pixel color value and the pixel alpha value of the pixel are distributed across the region of nearby pixels within the circular radius.

15. The computer-implemented method of claim 14, wherein, if the region of nearby pixels within the circular radius include a block of 4×4 pixels having a same color value and a same alpha transparency value, the splatting comprises summing a low-resolution splat image and a high-resolution splat image.

16. The computer-implemented method of claim 15, wherein the low-resolution splat image comprises blocks of 4×4 pixels, and the high-resolution splat image comprises blocks of 1×1 pixels.

17. The computer-implemented method of claim 1, wherein at least some of the pixel values for the pixel array are in a compressed format.

18. A computer system comprising:
one or more processors; and
a storage medium storing instructions, which when executed by the one or more processors, cause the computer system to implement the method of claim 1.

19. A non-transitory computer-readable storage medium storing instructions, which when executed by at least one processor of a computer system, causes the computer system to carry out the method of claim 1.

20. A non-transitory computer-readable medium storing instructions, which when executed by at least one processor of a computer system, causes the computer system to carry out the method of claim 1.

21. A user interface for processing image data that includes depth information, the user interface comprising:
an attributes and elements editor for obtaining from the user at least a portion of a scene description, wherein the scene description defines elements of a scene to be rendered into a rendered computer-generated image representable by a pixel array, wherein pixel values for the pixel array correspond to a rendering of the scene, the pixel array comprising a plurality of pixel data elements, wherein a pixel data element of a pixel of the pixel array includes a color value, an alpha value, and a depth value, and wherein the pixel data element has associated therewith an image position representing a position of the pixel in the rendered computer-generated image;
a lens attribute editor for obtaining from a user an indication of a lens function, wherein the lens function represents a lens shape and/or a lens effect;
a blur attribute editor for obtaining from the user a convolution range comprising adjacent pixels adjacent to the pixel, wherein the convolution range is based on a blur amount and a blur transparency value, wherein the blur amount is based on the lens function and the depth value of the pixel, and wherein the blur transparency value represents an amount of transparency to assign to the pixel based on the lens function and the depth value of the pixel; and
a display for displaying a modified image including a modified pixel having a modified pixel color value, wherein the modified pixel color value is a first value that is a function of a scaled blend color value formed from a blend color value, wherein the blend color value is a first scaled value that is based on the blur transparency value, and wherein the blend color value is a second value that is based on color values of the adjacent pixels.

22. The user interface of claim 21, further comprising a listing of objects in the scene, wherein each object in the listing of objects can be expanded to reveal details about the object.

23. The user interface of claim 22, wherein the details about the object include at least one of an object size, an object position, an object depth, an object alpha value, or an object color.

24. The user interface of claim 21, further comprising a defocus adjustment selector for selecting whether the blend color value or the scaled blend color value is to be employed as the modified pixel color value.

* * * * *